United States Patent
Jurski et al.

(10) Patent No.: US 11,544,129 B2
(45) Date of Patent: Jan. 3, 2023

(54) CROSS-COMPONENT HEALTH MONITORING AND IMPROVED REPAIR FOR SELF-HEALING PLATFORMS

(71) Applicant: Intel Corporation, Santa Clara, CA (US)

(72) Inventors: Janusz Jurski, Hillsboro, OR (US); Mariusz Stepka, Gdansk (PL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/466,536

(22) Filed: Sep. 3, 2021

(65) Prior Publication Data
US 2021/0397507 A1 Dec. 23, 2021

Related U.S. Application Data

(63) Continuation of application No. 16/474,472, filed as application No. PCT/US2016/068654 on Dec. 27, 2016, now Pat. No. 11,113,133.

(51) Int. Cl.
*G06F 11/00* (2006.01)
*G06F 11/07* (2006.01)
*G06F 11/22* (2006.01)

(52) U.S. Cl.
CPC ...... *G06F 11/0751* (2013.01); *G06F 11/0724* (2013.01); *G06F 11/0793* (2013.01); *G06F 11/2284* (2013.01)

(58) Field of Classification Search
None
See application file for complete search history.

(56) References Cited

U.S. PATENT DOCUMENTS

| | | | | |
|---|---|---|---|---|
| 8,417,774 B2* | 4/2013 | Flynn | ............ | G06F 12/0804 714/E11.154 |
| 2003/0005277 A1* | 1/2003 | Harding | ............ | G06F 21/575 714/E11.133 |
| 2014/0281453 A1* | 9/2014 | Friedman | ............ | G06F 1/32 713/2 |
| 2015/0278068 A1* | 10/2015 | Swanson | ............ | G06F 21/575 713/2 |
| 2015/0301880 A1* | 10/2015 | Allu | ............ | G06F 11/0709 714/4.3 |
| 2016/0328300 A1* | 11/2016 | Rahardjo | ............ | G06F 11/1417 |
| 2016/0378602 A1* | 12/2016 | Herzi | ............ | G06F 11/2284 714/2 |
| 2017/0220404 A1* | 8/2017 | Polar Seminario | ............ | G06F 11/0751 |

* cited by examiner

*Primary Examiner* — Joshua P Lottich
(74) *Attorney, Agent, or Firm* — Jordan IP Law, LLC

(57) ABSTRACT

Systems, apparatuses and methods may provide for technology that detects a successful boot of a first firmware component in a computing system, receives a signal from a second firmware component in the computing system, and detects an incompatibility of the first firmware component with respect to the second firmware component based on the signal. In one example, only the first firmware component is repaired in response to the incompatibility.

24 Claims, 4 Drawing Sheets

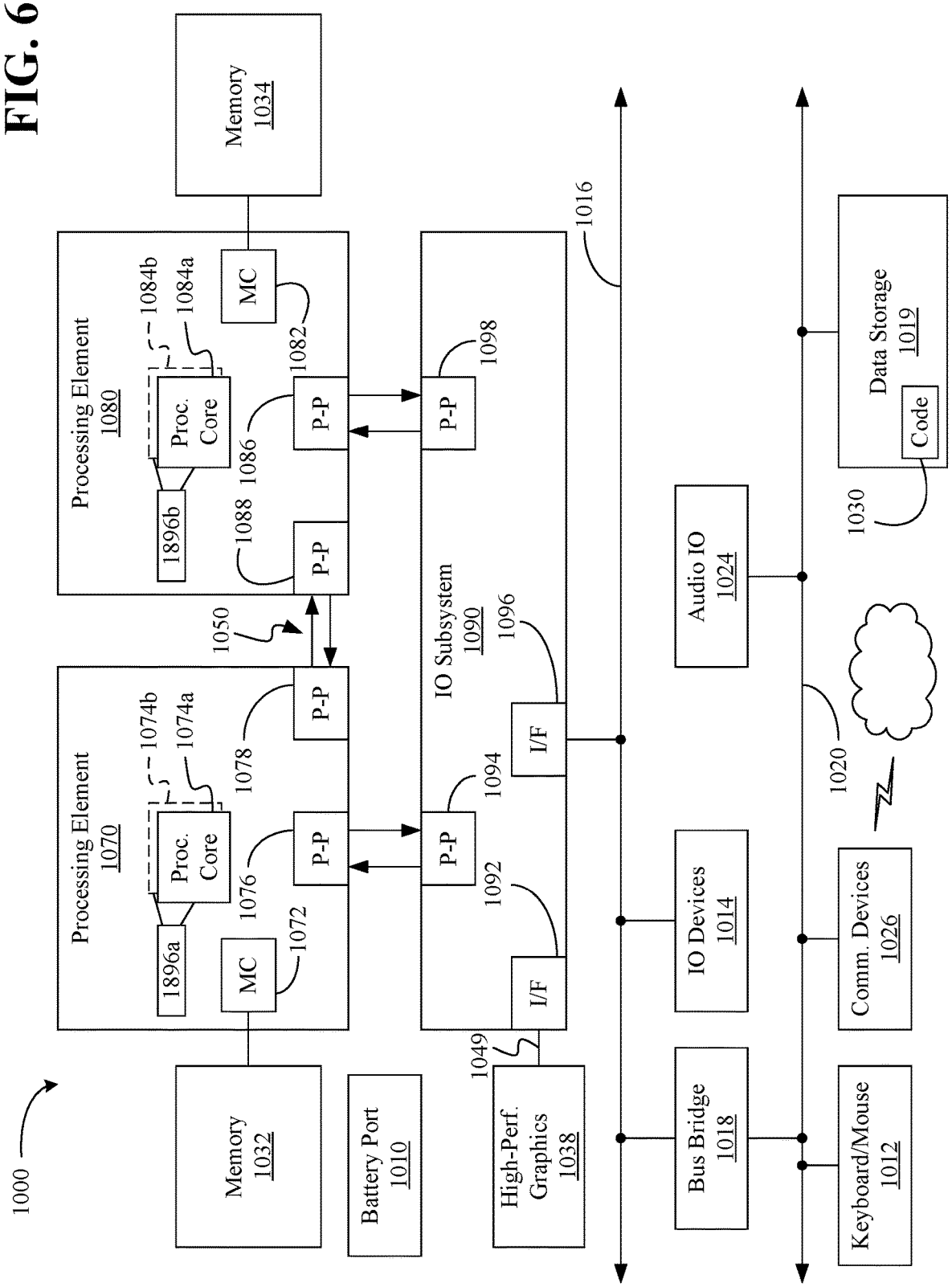

CROSS-COMPONENT HEALTH MONITORING AND IMPROVED REPAIR FOR SELF-HEALING PLATFORMS

CROSS REFERENCE TO RELATED APPLICATIONS

The present application is a continuation of and claims the benefit of priority to U.S. Non-Provisional patent application Ser. No. 16/474,472 filed on Jun. 27, 2019, which claims the benefit of priority to International Patent Application No. PCT/US2016/068654 filed on Dec. 27, 2016.

TECHNICAL FIELD

Embodiments generally relate to computing system reliability. More particularly, embodiments relate to cross-component health monitoring and improved repair in self-healing platforms.

BACKGROUND

Low level firmware such as BIOS (Basic Input/Output System) and BMC (Board Management Controller) components, which may be responsible for reliable booting of a computing system/platform, may also interact with one another during various stages of operation of the computing system. Incompatibility in the behaviors of the low level firmware may result in either restricted functionality or complete failure.

BRIEF DESCRIPTION OF THE DRAWINGS

The various advantages of the embodiments will become apparent to one skilled in the art by reading the following specification and appended claims, and by referencing the following drawings, in which:

FIG. 6 is a block diagram of an example of a computing system according to an embodiment.

DESCRIPTION OF EMBODIMENTS

Figure 1:
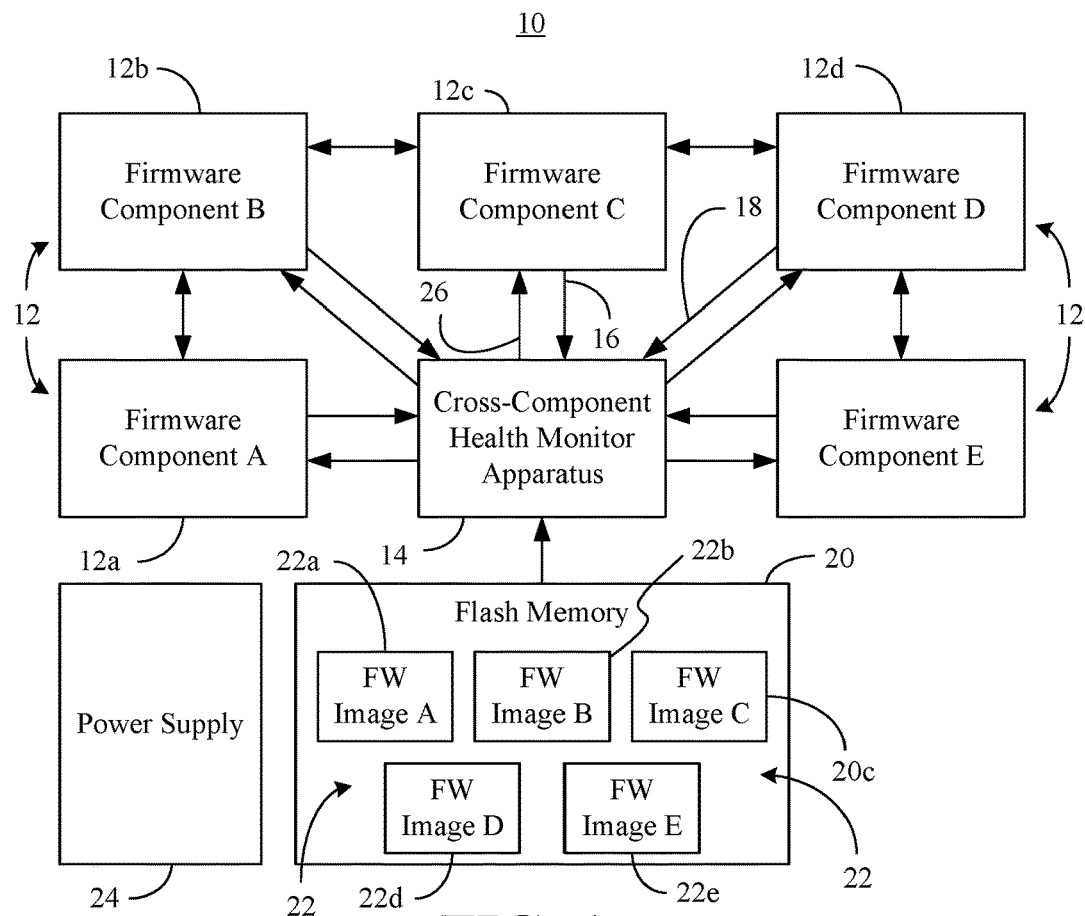
FIG. 1 is a block diagram of an example of a computing system that includes a cross-component health monitor apparatus according to an embodiment.

Turning now to FIG. 1, a self-healing computing system 10 is shown. The computing system 10 might be part of a datacenter server, desktop computer, notebook computer, tablet computer, convertible tablet, smart phone, mobile Internet device (MID), personal digital assistant (PDA), wearable computer, image capture device, media player, etc., or any combination thereof. In the illustrated example, a plurality of separate firmware components 12 (12a-12e) facilitate the successful boot and operation of the computing system 10. The firmware components 12 may include non-volatile memory (e.g., read only memory/ROM, electrically programmable ROM/EPROM, flash memory, etc.) containing, for example, Basic Input/Output System (BIOS), Board Management Controller (BMC), remote access (e.g., Manageability Engine/ME), network controller, factory customization (e.g., Innovation Engine), processor microcode, and/or other low-level platform firmware. Additionally, the firmware components 12, may interact with one another during various stages of operation of the computing system 10.

For example, a first firmware component 12a ("Firmware Component A") might include network controller firmware that is communicatively coupled to a second firmware component 12b ("Firmware Component B") that may include factory customization firmware. The second firmware component 12b may in turn be communicatively coupled to a third firmware component 12c ("Firmware Component C") that includes remote access firmware. Moreover, the third firmware component 12c may be communicatively coupled to a fourth firmware component 12d ("Firmware component D") that includes BIOS. The fourth firmware component 12d may also be communicatively coupled to a fifth firmware component 12e ("Firmware Component E") that includes BMC firmware.

As will be discussed in greater detail, incompatibilities between the firmware components 12 may occur as a result of an update to and/or partial failure/corruption of one or more of the firmware components 12. For example, an update to the third firmware component 12c might cause the third firmware component 12c to exhibit an unexpected capability set, protocol and/or communication timing during communications with the fourth firmware component 12d. Indeed, the incompatibility may be observed by the fourth firmware component 12d after both the third firmware component 12c and the fourth firmware component 12d have completed a successful boot (e.g., having confirmed image signatures and boot status reports). Accordingly, a cross-component health monitor apparatus 14 may be communicatively coupled to each of the firmware components 12, wherein the health monitor apparatus 14 detects cross-component incompatibilities and automatically repairs incompatible firmware components.

For example, the health monitor apparatus 14 might detect the successful boot of the third firmware component 12c and the fourth firmware component 12d via inbound communication channels 16 and 18, respectively, and subsequently detect the incompatibility of the third firmware component 12c based on a signal (e.g., message and/or data in digital and/or analog format) from the fourth firmware component 12d via the inbound communication channel 18. Thus, the illustrated solution enables incompatibilities between the firmware components 12 to be detected even when the firmware components 12 have not been compromised (e.g., according to image signatures) and have booted successfully (e.g., according to boot reports).

The computing system 10 may also include a power supply 24 to provide power to the computing system 10 and flash memory 20 that stores "golden" firmware (FW) images 22 (22a-22e). Accordingly, the health monitor apparatus 14 may also repair only the third firmware component 12c by retrieving an earlier firmware image 22c ("FW Image C") from the flash memory 20 and reverting the third firmware component 12c to the earlier firmware image 22c via an outbound communication channel 26. The inbound communication channels 16, 18 and the outbound communication channel 26 may be incorporated into a synchronous serial interface such as, for example, a Serial Peripheral Interface (SPI).

Of particular note is that the repair health monitor apparatus 14 may bypass a repair of the fourth firmware component 12d, as well as the remaining firmware components 12 in the above scenario. The illustrated solution therefore limits the repair scope to only the malfunctioning firmware component, which may in turn enable faster recovery and minimal loss of user configuration data. In one example, the health monitor apparatus 14 is a dedicated field programmable gate array (FPGA) or other suitable configurable logic device.

Figure 2:
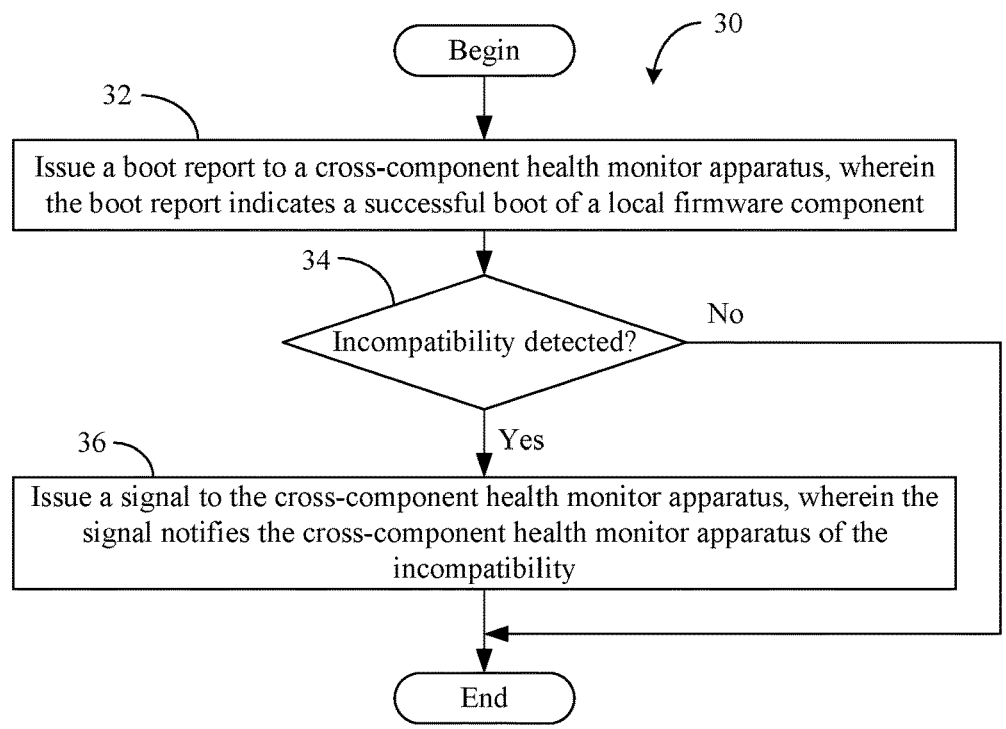
FIG. 2 is a flowchart of an example of a method of operating a firmware component according to an embodiment.

FIG. 2 shows a method 30 of operating a firmware component. The method 30 may generally be implemented in a firmware component such as, for example, one or more of the firmware components 12 (FIG. 1), already discussed. More particularly, the method 30 may be implemented as one or more modules in a set of logic instructions stored in a non-transitory machine- or computer-readable storage medium such as random access memory (RAM), read only memory (ROM), programmable ROM (PROM), flash memory, etc. For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 provides for issuing a boot report to a cross-component health monitor apparatus, wherein the boot report indicates a successful boot of a local firmware component. Additionally, a determination may be made at block 34 as to whether an incompatibility has been detected between the local firmware component and a different/separate firmware component from the local firmware component. The incompatibility may be detected based on one or more communications between the local firmware component and the separate firmware component. If an incompatibility is detected, a signal may be issued to the cross-component health monitor apparatus at block 36, wherein the signal notifies the cross-component health monitor apparatus of the incompatibility. The signal may indicate an unexpected capability set of the separate firmware component, an unexpected protocol used by the separate firmware component, an unexpected communication timing exhibited by the separate firmware component, etc., or any combination thereof. The signal may be a message and/or data in digital and/or analog format.

Figure 3:
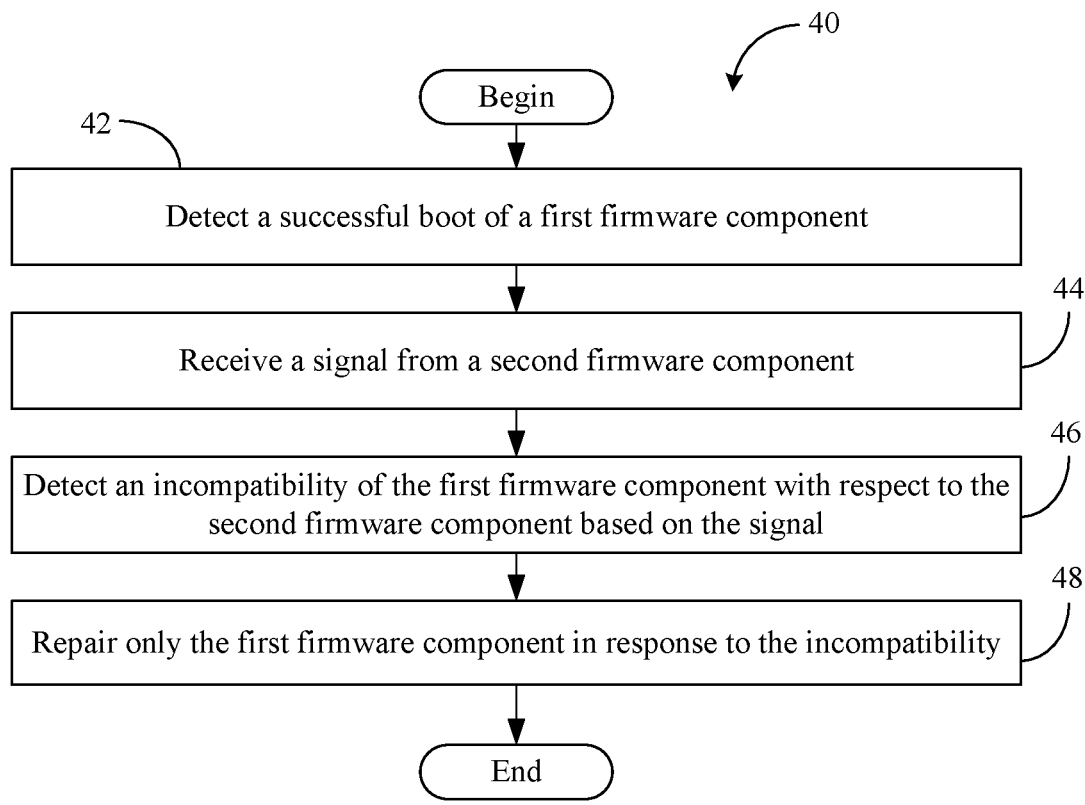
FIG. 3 is a flowchart of an example of a method of operating a cross-component health monitor apparatus according to an embodiment.

FIG. 3 shows a method 40 of operating a cross-component health monitor apparatus. The method 40 may generally be implemented in a health monitor apparatus such as, for example, the apparatus 14 (FIG. 1), already discussed. More particularly, the method 40 may be implemented as one or more modules in a set of logic instructions stored in a non-transitory machine- or computer-readable storage medium such as RAM, ROM, PROM, flash memory, etc., in configurable logic such as, for example, programmable logic arrays (PLAs), FPGAs, complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 42 provides for detecting a successful boot of a first firmware component in a computing system. Block 42 may include confirming an image signature of the first firmware component and receiving a first boot status report from the first firmware component, wherein the successful boot of the first firmware component is detected based on the first boot status report. Block 42 may additionally include confirming a second image signature associated with a second firmware component, receiving a second boot status report from the second firmware component, and detecting a successful boot of the second firmware component based on the second status report.

Block 44 may receive a signal from the second firmware component, wherein illustrated block 46 detects an incompatibility of the first firmware component with respect to the second firmware component based on the signal. As already noted, the signal may indicate one or more of an unexpected capability set of the first firmware component, an unexpected protocol used by the first firmware component or an unexpected communication timing exhibited by the first firmware component. Illustrated block 48 repairs only the first firmware component in response to the incompatibility. Thus, block 48 may include bypassing a repair of the second firmware component. Moreover, block 48 may include reverting the first firmware component to an earlier firmware version (e.g., a golden image).

Figure 4:
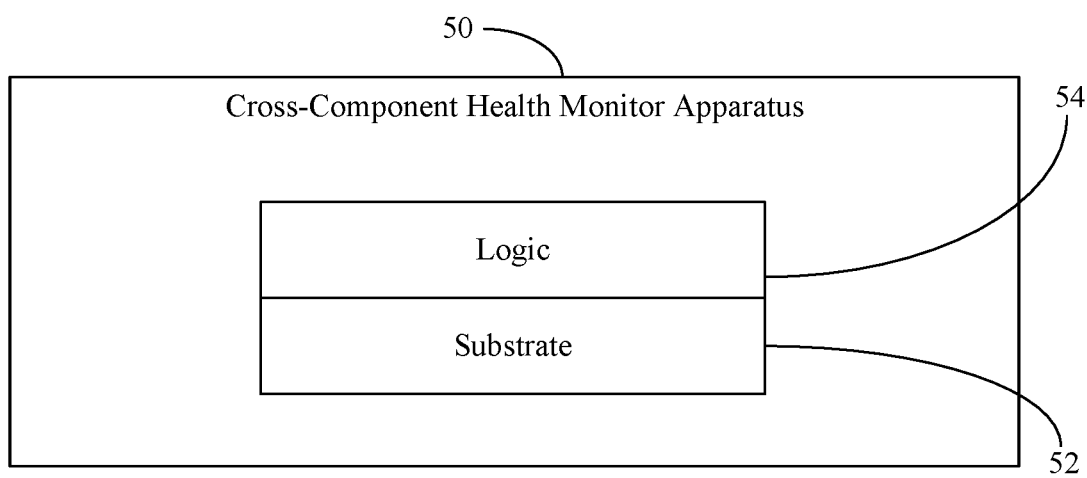
FIG. 4 is a block diagram of an example of a cross-component health monitor apparatus according to an embodiment.

FIG. 4 shows a cross-component health monitor apparatus 50. The apparatus 50 may implement one or more aspects of the method 40 (FIG. 3) and may be readily substituted for the health monitor apparatus 14 (FIG. 1), already discussed. The illustrated apparatus 50 includes a substrate 52 (e.g., silicon, sapphire, gallium arsenide) and logic 54 (e.g., transistor array and other integrated circuit/IC components) coupled to the substrate 52. The logic 54 may be implemented at least partly in configurable logic or fixed-functionality logic hardware. Moreover, the logic 54 may detect a successful boot of a first firmware component in a computing system, receive a signal from a second firmware component in the computing system, and detect an incompatibility of the first firmware component with respect to the second firmware component based on the signal.

Figure 5:
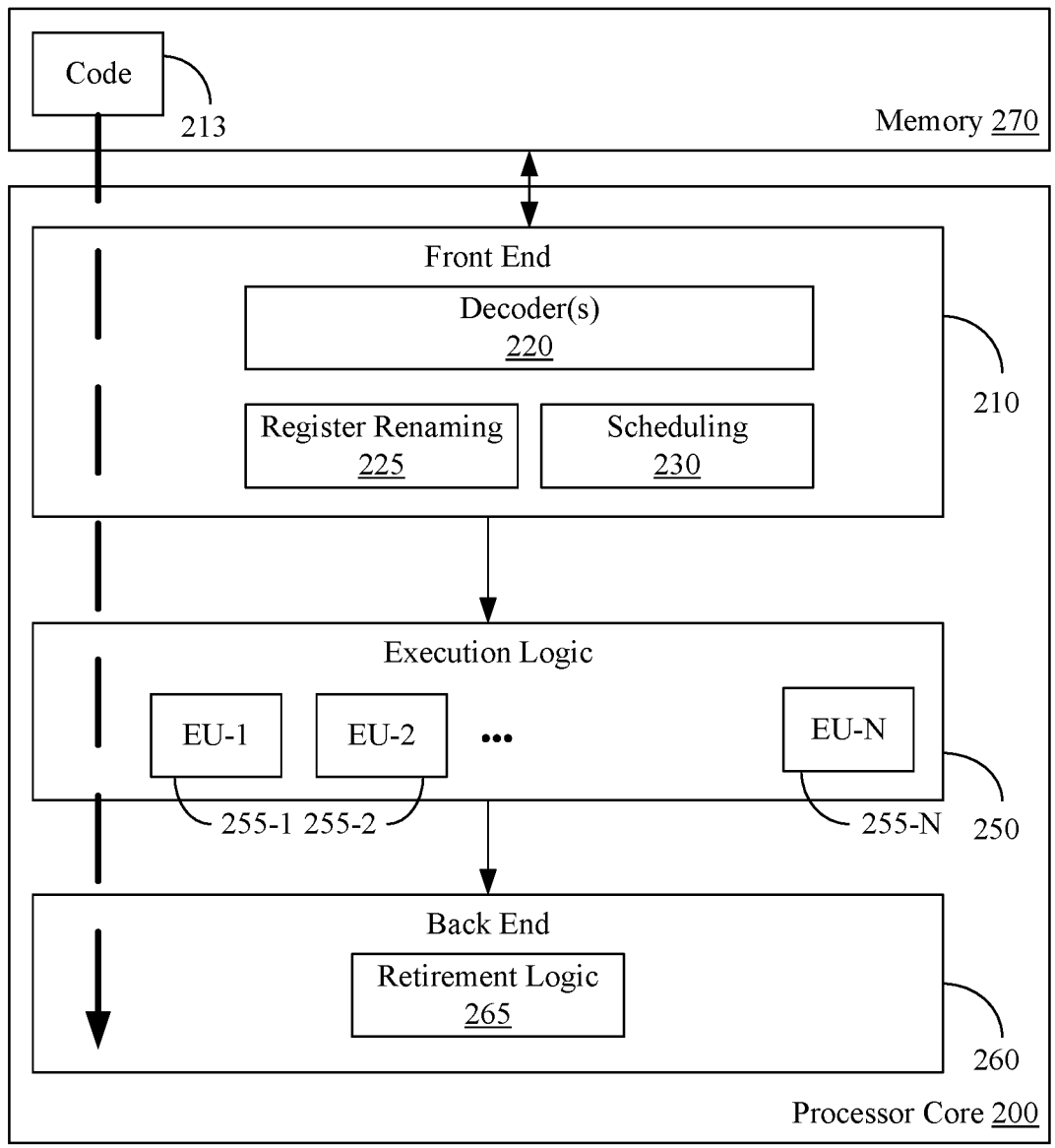
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 2) and/or the method 40 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 5.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030, which may be similar to the code 213 (FIG. 5), may implement one or more aspects of the method 30 (FIG. 2) and/or the method 40 (FIG. 3), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples:

Example 1 may include a self-healing computing system comprising a power supply to provide power to the computing system, a first firmware component, a second firmware component communicatively coupled to the first firmware component, and a cross-component health monitor apparatus communicatively coupled to the first firmware component and the second firmware component, the cross-component health monitor apparatus including a substrate and logic coupled to the substrate, wherein the logic is to detect a successful boot of the first firmware component, receive a signal from the second firmware component, and detect an incompatibility of the first firmware component with respect to the second firmware component based on the signal.

Example 2 may include the computing system of Example 1, wherein the logic is to repair the first firmware component in response to the incompatibility.

Example 3 may include the computing system of Example 2, wherein the logic is to bypass a repair of the second firmware component.

Example 4 may include the computing system of Example 3, wherein the logic is to confirm a second image signature associated with the second firmware component, receive a second boot status report from the second firmware component, and detect a successful boot of the second firmware component based on the second boot status report.

Example 5 may include the computing system of any one of Examples 2 to 4, further including a flash memory to store an earlier firmware version of the first firmware component, wherein the logic is to revert the first firmware component to the earlier firmware version to repair the first firmware component.

Example 6 may include a cross-component health monitor apparatus comprising a substrate, and logic coupled to the substrate and implemented at least partly in one or more of configurable logic or fixed-functionality logic hardware, the logic to detect a successful boot of a first firmware component in a computing system, receive a signal from a second firmware component in the computing system, and detect an incompatibility of the first firmware component with respect to the second firmware component based on the signal.

Example 7 may include the apparatus of Example 6, wherein the logic is to repair the first firmware component in response to the incompatibility.

Example 8 may include the apparatus of Example 7, wherein the logic is to bypass a repair of the second firmware component.

Example 9 may include the apparatus of Example 8, wherein the logic is to confirm a second image signature associated with the second firmware component, receive a second boot status report from the second firmware component, and detect a successful boot of the second firmware component based on the second boot status report.

Example 10 may include the apparatus of any one of Examples 7 to 9, wherein the logic is to revert the first firmware component to an earlier firmware version to repair the first firmware component.

Example 11 may include the apparatus of Example 6, wherein the signal is to indicate one or more of an unexpected capability set of the first firmware component, an unexpected protocol used by the first firmware component or an unexpected communication timing exhibited by the first firmware component.

Example 12 may include the apparatus of Example 6, wherein the logic is to confirm an image signature of the first firmware component, and receive a first boot status report from the first firmware component, wherein the successful boot of the first firmware component is detected based on the first boot status report.

Example 13 may include a method of operating a cross-component health monitor apparatus, comprising detecting a successful boot of a first firmware component in a computing system, receiving a signal from a second firmware component in the computing system, and detecting an incompatibility of the first firmware component with respect to the second firmware component based on the signal.

Example 14 may include the method of Example 13, further including repairing the first firmware component in response to the incompatibility.

Example 15 may include the method of Example 14, further including bypassing a repair of the second firmware component.

Example 16 may include the method of Example 15, further including confirming a second image signature associated with the second firmware component, receiving a second boot status report from the second firmware component, and detecting a successful boot of the second firmware component based on the second boot status report.

Example 17 may include the method of any one of Examples 14 to 16, wherein repairing the first firmware component includes reverting the first firmware component to an earlier firmware version.

Example 18 may include at least one computer readable storage medium comprising a set of instructions, which when executed by a computing system, cause the computing system to detect a successful boot of a first firmware component in the computing system, receive a signal from a second firmware component in the computing system, and detect an incompatibility of the first firmware component with respect to the second firmware component based on the signal.

Example 19 may include the at least one computer readable storage medium of Example 18, wherein the instructions, when executed, cause the computing system to repair the first firmware component in response to the incompatibility.

Example 20 may include the at least one computer readable storage medium of Example 19, wherein the instructions, when executed, cause the computing system to bypass a repair of the second firmware component.

Example 21 may include the at least one computer readable storage medium of Example 20, wherein the instructions, when executed, cause the computing system to confirm a second image signature associated with the second firmware component, receive a second boot status report from the second firmware component, and detect a successful boot of the second firmware component based on the second boot status report.

Example 22 may include the at least one computer readable storage medium of any one of Examples 19 to 21, wherein the instructions, when executed, cause the computing system to revert the first firmware component to an earlier firmware version to repair the first firmware component.

Example 23 may include the at least one computer readable storage medium of Example 18, wherein the signal is to indicate one or more of an unexpected capability set of the first firmware component, an unexpected protocol used by the first firmware component or an unexpected communication timing exhibited by the first firmware component.

Example 24 may include the at least one computer readable storage medium of Example 18, wherein the instructions, when executed, cause the computing system to confirm an image signature of the first firmware component, and receive a first boot status report from the first firmware component, wherein the successful boot of the first firmware component is detected based on the first boot status report.

Example 25 may include a method of operating a local firmware component, comprising issuing a boot report from the local firmware component to a cross-component health monitor apparatus, wherein the boot report indicates a successful boot of the local firmware component, detecting an incompatibility between the local firmware component and a separate firmware component from the local firmware component, wherein the incompatibility is detected based on one or more communications with the separate firmware component, and issuing a signal from the local firmware component to the cross-component health monitor apparatus, wherein the signal notifies the cross-component health monitor apparatus of the incompatibility.

Example 26 may include the method of Example 25, wherein the signal indicates one or more of an unexpected capability set of the separate firmware component, an unexpected protocol used by the separate firmware component or an unexpected communication timing exhibited by the separate firmware component.

Example 27 may include at least one computer readable storage medium comprising a set of instructions, which when executed by a computing system, cause the computing system to issue a boot report from a local firmware component to a cross-component health monitor apparatus, wherein the boot report is to indicate a successful boot of the local firmware component, detect an incompatibility between the local firmware component and a separate firmware component from the local firmware component, wherein the incompatibility is to be detected based on one or more communications with the separate firmware component, and issue a signal from the local firmware component to the cross-component health monitor apparatus, wherein the signal is to notify the cross-component health monitor apparatus of the incompatibility.

Example 28 may include the at least one computer readable storage medium of Example 27, wherein the signal is to indicate one or more of an unexpected capability set of the separate firmware component, an unexpected protocol used by the separate firmware component or an unexpected communication timing exhibited by the separate firmware component.

Thus, technology described herein may detect incompatible behaviors between components. Additionally, technology described herein may only repair the incompatible components while leaving other components untouched. As a result repair scope may be minimized, which may result in faster repair times and minimization of loss of user configuration data.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A computing system comprising:
a graphics processor;
a central processing unit; and
a memory including a set of instructions, which when executed by one or more of the graphics processor or the central processing unit, cause the computing system to:

issue, with a first firmware component, a boot report to a cross-component health monitor apparatus, wherein the boot report indicates a successful boot of the first firmware component;

detect, with the first firmware component, whether an incompatibility exists between the first firmware component and a second firmware component separate from the first firmware component; and if an incompatibility is detected, issue, with the first firmware component, a signal to the cross-component health monitor apparatus, wherein the cross-component health monitor apparatus is to repair one or more of the first firmware component or the second firmware component when the incompatibility is detected.

2. The computing system of claim 1, wherein the instructions, when executed, cause the computing system to:

detect, with the first firmware component, the incompatibility based on one or more communications between the first firmware component and the second firmware component.

3. The computing system of claim 1, wherein the signal is to notify the cross-component health monitor apparatus of the incompatibility.

4. The computing system of claim 1, wherein the signal is to indicate an unexpected capability set of the second firmware component.

5. The computing system of claim 1, wherein the signal is to indicate an unexpected protocol used by the second firmware component.

6. The computing system of claim 1, wherein the signal is to indicate an unexpected communication timing exhibited by the second firmware component.

7. An apparatus comprising:

a substrate; and logic coupled to the substrate and implemented at least partly in one or more of configurable logic or fixed-functionality logic hardware, the logic to:

issue, with a first firmware component, a boot report to a cross-component health monitor apparatus, wherein the boot report indicates a successful boot of the first firmware component;

detect, with the first firmware component, whether an incompatibility exists between the first firmware component and a second firmware component separate from the first firmware component; and if an incompatibility is detected, issue, with the first firmware component, a signal to the cross-component health monitor apparatus, wherein the cross-component health monitor apparatus is to repair one or more of the first firmware component or the second firmware component when the incompatibility is detected.

8. The apparatus of claim 7, wherein the logic is to:

detect, with the first firmware component, the incompatibility based on one or more communications between the first firmware component and the second firmware component.

9. The apparatus of claim 7, wherein, wherein the signal is to notify the cross-component health monitor apparatus of the incompatibility.

10. The apparatus of claim 7, wherein the signal is to indicate an unexpected capability set of the second firmware component.

11. The apparatus of claim 7, wherein the signal is to indicate an unexpected protocol used by the second firmware component.

12. The apparatus of claim 7, wherein the signal is to indicate an unexpected communication timing exhibited by the second firmware component.

13. A method comprising:

issuing, with a first firmware component, a boot report to a cross-component health monitor apparatus, wherein the boot report indicates a successful boot of the first firmware component;

detecting, with the first firmware component, whether an incompatibility exists between the first firmware component and a second firmware component separate from the first firmware component; and if an incompatibility is detected, issuing, with the first firmware component, a signal to the cross-component health monitor apparatus, wherein the cross-component health monitor apparatus is to repair one or more of the first firmware component or the second firmware component when the incompatibility is detected.

14. The method of claim 13, wherein the method further comprises:

detecting, with the first firmware component, the incompatibility based on one or more communications between the first firmware component and the second firmware component.

15. The method of claim 13, wherein, wherein the signal notifies the cross-component health monitor apparatus of the incompatibility.

16. The method of claim 13, wherein the signal indicates an unexpected capability set of the second firmware component.

17. The method of claim 13, wherein the signal indicates an unexpected protocol used by the second firmware component.

18. The method of claim 13, wherein the signal indicates an unexpected communication timing exhibited by the second firmware component.

19. At least one non-transitory computer readable storage medium comprising a set of instructions, which when executed by a computing system, cause the computing system to:

issue, with a first firmware component, a boot report to a cross-component health monitor apparatus, wherein the boot report indicates a successful boot of the first firmware component;

detect, with the first firmware component, whether an incompatibility exists between the first firmware component and a second firmware component separate from the first firmware component; and if an incompatibility is detected, issue, with the first firmware component, a signal to the cross-component health monitor apparatus, wherein the cross-component health monitor apparatus is to repair one or more of the first firmware component or the second firmware component when the incompatibility is detected.

20. The at least one non-transitory computer readable storage medium of claim 19, wherein the instructions, when executed, cause the computing system to:

detect, with the first firmware component, the incompatibility based on one or more communications between the first firmware component and the second firmware component.

21. The at least one non-transitory computer readable storage medium of claim 19, wherein the signal is to notify the cross-component health monitor apparatus of the incompatibility.

22. The at least one non-transitory computer readable storage medium of claim 19, wherein the signal is to indicate an unexpected capability set of the second firmware component.

23. The at least one non-transitory computer readable storage medium of claim 19, wherein the signal is to indicate an unexpected protocol used by the second firmware component.

24. The at least one non-transitory computer readable storage medium of claim 19, wherein the signal is to indicate an unexpected communication timing exhibited by the second firmware component.

\* \* \* \* \*